United States Patent [19]

Messing et al.

[11] Patent Number: 4,983,037
[45] Date of Patent: Jan. 8, 1991

[54] ESTIMATION OF FIBER LOSS AND RETURN SIGNAL POWER

[75] Inventors: Dean S. Messing, Aloha; Ajay K. Luthra, Beaverton, both of Oreg.

[73] Assignee: Tektronix, Inc., Beaverton, Oreg.

[21] Appl. No.: 347,617

[22] Filed: May 5, 1989

[51] Int. Cl.$^5$ .................... G01N 21/59; G01N 21/84
[52] U.S. Cl. ................................................ 356/73.1
[58] Field of Search ..................................... 356/73.1

[56] References Cited

FOREIGN PATENT DOCUMENTS 3520421 12/1986 Fed. Rep. of Germany ..... 356/73.1

Primary Examiner—Vincent P. McGraw
Attorney, Agent, or Firm—Francis I. Gray; William K. Bucher

[57] ABSTRACT

A method of determining estimates of fiber loss and return signal power for an optical fiber from a return signal uses a polynomial fit with data samples representing the return signal. From the polynomial fit an estimated fiber loss value is determined. The estimated return signal power is computed using a function of the estimated fiber loss value.

4 Claims, 2 Drawing Sheets

ESTIMATION OF FIBER LOSS AND RETURN SIGNAL POWER

BACKGROUND OF THE INVENTION

The present invention relates to time domain reflectometry, and more particularly to a method of estimating fiber loss per unit distance and return signal power at a given point efficiently from a sampled return signal acquired by an optical time domain reflectometer (OTDR).

In an OTDR a laser pulse is injected into an optical fiber and a photosensitive detector receives the light that returns due to Rayleigh backscattering. Ideally the optical power of the received signal is $$P = A \times 10^{-Lnd/5} \quad (1)$$

where A is the power of the return signal at an injection point (n=0), L is the one-way loss in units of decibels per kilometer (fiber loss), d is the sampling period in kilometers, and n is the sample index. In a real system this ideal signal is corrupted by additive Gaussian white noise that adds a component, v(n), to the optical power of the received signal. Since the return signal is exponentially decaying, it is quickly buried in the receiver background noise, making the determination of fiber characteristics in the noisy region very difficult.

Two of the primary measurements in optical reflectometry are the values of A and L. The standard technique for measuring these unknowns is to fit a line, defined by the expression Mn+B, in the least squares sense to the logarithm, base ten, of the signal defined in equation (1). Were the signal noiseless, this results in M=−Ld, from which L is immediately available, and in B=51 ogA. But as the signal to noise ratio (SNR) decreases, M and B rapidly depart from the desired values and become biased and jittery from the noise. When the SNR drops below 5 dB, the bias becomes large and the variance, or jitter, becomes much greater than that demanded by the theoretical minimum. Moreover any negative data values coming from the noisy version of equation (1) must be thrown out since the logarithm is undefined.

What is desired is a method of estimating the values of fiber loss and return signal power in the presence of noise.

SUMMARY OF THE INVENTION

Accordingly the present invention provides a method of estimating fiber loss and return signal power by fitting a polynomial to the original, unlogged exponential data. The difference between the polynomial and the original, unlogged exponential data are minimized in the least squares sense to obtain the coefficients for the polynomial. A simple function of the two lowest degree coefficients of the polynomial produces an approximation of the fiber loss. Once an approximation of the fiber loss is determined, then an estimated function of the optical power of the return signal is determined by computing a closed form summation of a unit amplitude exponential using the determined fiber loss over n points. The resulting summation is divided into the summation of the original, unlogged exponential data over the same n points to produce the estimate of the return signal power.

The objects, advantages and other novel features of the present invention are apparent from the following detailed description when read in conjunction with the appended claims and attached drawing.

DESCRIPTION OF THE PREFERRED EMBODIMENT

Figure 1:
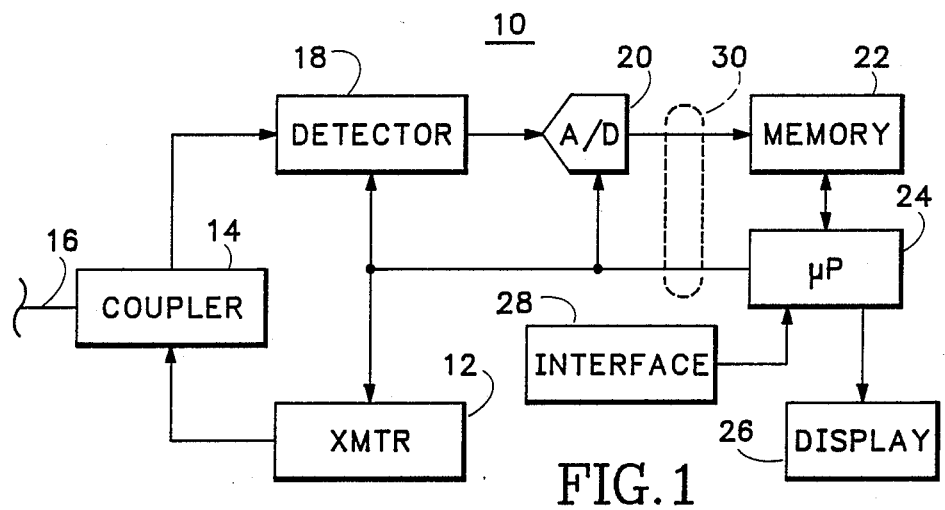
FIG. 1 is a block diagram of an optical time domain reflectometer that uses the fiber loss estimation method of the present invention.

Referring now to FIG. 1 an optical time domain reflectometer (OTDR) 10 is shown having an optical transmitter 12 that transmits a light pulse via a coupler 14 into an optical fiber 16. The Rayleigh backscattered return signal from the optical fiber 16 is passed by the coupler 14 to a detector 18, the output of which is sampled by an analog to digital converter 20 and stored in a suitable memory device 22. A microprocessor 24 controls the pulse repetition frequency and pulse width of the transmitted light pulse as well as the sample start time, data duration and sample rate for the received signal. The microprocessor 24 then processes the received data stored in the memory device 22 to generate a display on a suitable display device 26 that includes both an analog display and an alphanumeric display, the information displayed and the various operating parameters being determined by an operator from a control interface 28. The microprocessor 24 may be an integral part of the OTDR 10, or may be a separate device that communicates with the OTDR over a suitable interface bus 30.

Equation (1) in the presence of noise may be written in the following form:

$$f(n) = Ae^{-an} + v(n) \quad (2)$$

where e is the base of the natural logarithm, v(n) is the zero mean Gaussian white noise, A is the amplitude (light power) of the return signal, and "a" is the normalized loss per sample, or decay rate, that is related to dB/Km (L) by L=ak/d where K=5/ln(10). The present algorithm fits a polynomial to the original, unlogged exponential data of the return signal. A discrete time exponential can be represented by its Taylor series expansion as $$g(n) = Ae^{-an} = A - Aan + (Aa^2)n^2/2! \ldots \quad (3)$$

Figure 2:
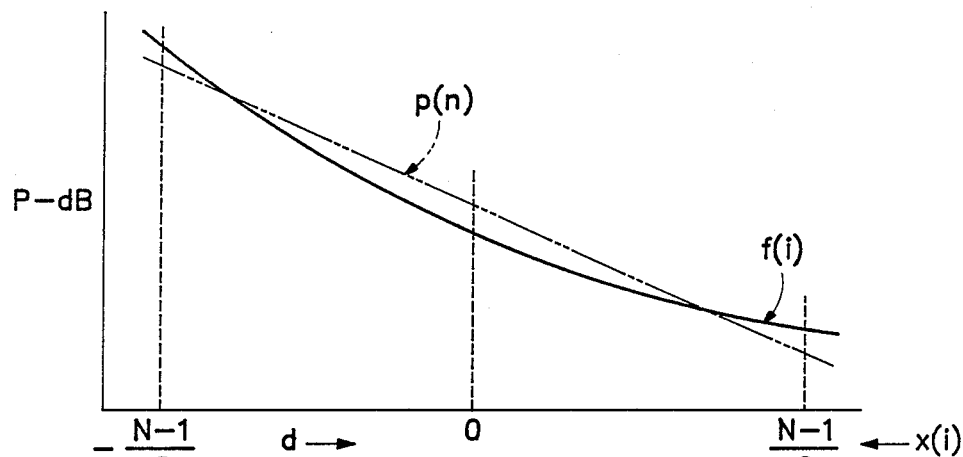
FIG. 2 is a graphic view of the fitting of a first order polynomial to the sampled return signal data according to the estimation method of the present invention.

If the first two coefficients of this polynomial series are known, then the decay rate, a, may be computed by simple division. Given N samples of g(n), an order M polynomial may be constructed $$p_M(n) = t_0 + t_1 n + \ldots + t_M n^M \quad (4)$$

such that an error expression $$E^2 = SUM\{g(n) - p_M(n)\}^2 \quad (5)$$

summed over $n = -(N-1)/2$ to $(N-1)/2$ is minimized as illustrated in FIG. 2. Since $t_0$ and $t_1$ are approximations of the first two coefficients of g(n), $-t_1/t_0$ is an approximation of the decay rate, a.

Figure 3:
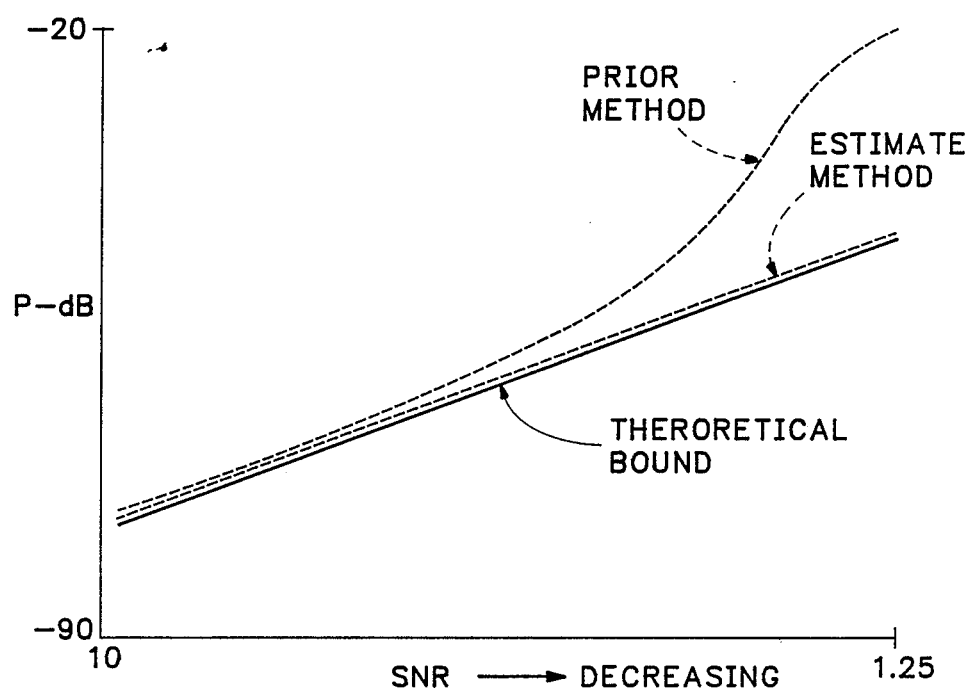
FIG. 3 is a graphic view of the results of the fiber loss estimation method of the present invention.

The actual implementation of the algorithm fits a first order polynomial, i.e., a line, to the original exponential data. Such a line fit gives estimates that have a variance virtually equal to the theoretical minimum as is shown in FIG. 3. The following value is determined:

$$s2 = SUM\{n^2\} = N*(N+1)*(N-1)/12 \quad (6)$$

summed over $-(N-1)/2$ to $(N-1)/2$ where n are the sample indices, the number of samples used being odd and symmetrical about a central sample. Then the values $$sf = SUM\{f(n)\} \quad (7)$$

and $$sxlf = SUM\{n*f(n)\} \quad (8)$$

are computed over the same range of n, where f(n) represents the actual data values. The estimated value of the decay rate, a, becomes $$\begin{aligned} a' &= -(sxlf*N)/(s2*sf) = -t_1/t_o & (9) \\ &= -N*SUM\{n*f(n)\}/[SUM\{n^2\}*SUM\{f(n)\}] & (10) \end{aligned}$$

Although the optimal method for computing an estimated value of A is to fit, in the least squared sense, an exponential with decay rate a' to the original, unlogged exponential data $$A' = SUM\{f(n)*e^{-a'n}\}/SUM\{(e^{-a'n})^2\} \quad (11)$$

this is computationally expensive. Since $SUM\{f(n)\}$ is approximately equal to $A*SUM\{e^{-an}\}$, $SUM\{F(n)\}$ is calculated, where $F(n) = e^{-a'n}$. Dividing $SUM\{f(n)\}$, which has been previously calculated, by $SUM\{F(n)\}$ produces A', an estimated value for A as a function of a'. Using the above nomenclature:

$$A' = sf/SUM\{F(n)\} \quad (11)$$

Thus the present invention provides a method of estimating the fiber loss and return signal power of an optical fiber by using a first order polynomial fit in the least squares sense with the original, unlogged sampled data, a function of the coefficients of the first order polynomial being an estimate of the fiber loss. The return signal power is computed as the division of the summation of the noisy signal by a function of the estimated fiber loss.

What is claimed is:

1. A method of determining fiber loss from a return signal from an optical fiber comprises the steps of:
   fitting a polynomial to original, unlogged data samples of the return signal; and
   computing an estimate of the fiber loss as a function of the coefficients of the polynomial.

2. A method as recited in claim 1 further comprises the step of determining a return signal power estimate of the return signal as a function of the estimated fiber loss.

3. A method as recited in claim 2 wherein the determining step comprises:
   generating an exponential as a function of the estimated fiber loss; and
   dividing a summation of the unlogged data samples over n samples by the summation of the exponential over the same n samples to obtain the return signal power estimate.

4. A method as recited in claim 1 further comprises the step of fitting an exponential to the return signal, the exponential being a function of the estimated fiber loss, to determine a return signal power estimate.

* * * * *

UNITED STATES PATENT AND TRADEMARK OFFICE
CERTIFICATE OF CORRECTION

PATENT NO. : 4,983,037

DATED : January 8, 1991

INVENTOR(S) : Dean Messing & Ajay Luthra

It is certified that error appears in the above-identified patent and that said Letters Patent is hereby corrected as shown below:

Column 4, line 18, after "to" delete "original,"

On drawing:
    Fig. 2 of the drawing replace "P-db" on the vertical scale with "Return Power Linear Scale".

Signed and Sealed this

Twelfth Day of April, 1994

Attest:

BRUCE LEHMAN

Attesting Officer

Commissioner of Patents and Trademarks